(12) United States Patent
Yang et al.

(10) Patent No.: US 11,962,520 B2
(45) Date of Patent: Apr. 16, 2024

(54) PHASE NOISE HANDLING IN MILLIMETER WAVE COMMUNICATIONS

(71) Applicant: Apple Inc., Cupertino, CA (US)

(72) Inventors: Weidong Yang, San Diego, CA (US); Oghenekome Oteri, San Diego, CA (US); Haitong Sun, Cupertino, CA (US); Chunhai Yao, Beijing (CN); Yushu Zhang, Beijing (CN); Dawei Zhang, Saratoga, CA (US); Chunxuan Ye, San Diego, CA (US); Wei Zeng, Saratoga, CA (US); Hong He, San Jose, CA (US); Sigen Ye, Whitehouse Station, NJ (US); Jie Cui, San Jose, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,735

(22) PCT Filed: May 14, 2020

(86) PCT No.: PCT/CN2020/090289
§ 371 (c)(1),
(2) Date: Sep. 23, 2021

(87) PCT Pub. No.: WO2021/226944
PCT Pub. Date: Nov. 18, 2021

(65) Prior Publication Data
US 2023/0054308 A1    Feb. 23, 2023

(51) Int. Cl.
*H04L 5/00*    (2006.01)
(52) U.S. Cl.
CPC ......... *H04L 5/0007* (2013.01); *H04L 5/0048* (2013.01)

(58) Field of Classification Search
CPC ............. H04L 5/0007; H04L 5/0048; H04L 5/0016; H04W 72/23; H04W 56/0035
See application file for complete search history.

(56) References Cited

U.S. PATENT DOCUMENTS

| 2016/0065390 A1 | 3/2016 | Kim |
| 2018/0278394 A1 | 9/2018 | Wang |

(Continued)

FOREIGN PATENT DOCUMENTS

| CN | 106105361 A | 11/2016 |
| EP | 3573300 A1 | 11/2019 |

OTHER PUBLICATIONS

Levanen, et al., "Mobile Communications Beyond 52.6 GHz: Waveforms, Numerology, and Phase Noise Challenge," arXiv:1912.09072v1, Dec. 19, 2019.

(Continued)

*Primary Examiner* — Ashley Shivers
(74) *Attorney, Agent, or Firm* — Blank Rome LLP

(57) ABSTRACT

Embodiments disclosed relate to apparatuses, systems, and methods for improved handling of phase noise (PN) in millimeter wave (MMW or mmWave) communications in a wireless communication system, such as 5G NR. When severe phase noise is present in a communication link, the link performance can be substantially degraded. Thus, it would be desirable to utilize techniques to compensate for phase noise in mmWave communications. In Rel-15, a Phase Tracking Reference Signal (PT-RS or PTRS) was specified for both downlink and uplink communications, specifically for Cyclic Prefix-Orthogonal Frequency Division Multiplexing (CP-OFDM) and Discrete Fourier Transform spread Orthogonal Frequency Division Multiplexing (DFT-S-OFDM). However, prior art approaches to PTRS using block-based pilot allocation schemes required complicated receiver processing. Thus, the techniques disclosed (Continued)

herein attempt to embed one or multiple bands with DFT-S-OFDM PTRS design in the data allocation bandwidth of an OFDM transmission to improve handling of PN at sub-OFDM symbol time intervals.

20 Claims, 14 Drawing Sheets

(56) References Cited

U.S. PATENT DOCUMENTS

2019/0052300 A1  2/2019  Margomenos
2019/0052433 A1* 2/2019  Yoo ..................... H04L 5/0082

OTHER PUBLICATIONS

Panasonic, "Discussion on PT-RS for DL," 3GPP TSG RAN WG1 Meeting #88, R1-1702297, Feb. 17, 2017 (Feb. 17, 2017).

* cited by examiner

PHASE NOISE HANDLING IN MILLIMETER WAVE COMMUNICATIONS

FIELD

The present application relates to wireless devices, and more particularly to apparatus, systems, and methods for handling phase noise (PN) in millimeter wave (MMW or mmWave) communications in a wireless communication system.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for improved handling of phase noise (PN) in millimeter wave (MMW or mmWave) communications in a wireless communication system, such as 5G NR In 5G NR, mmWave refers to the portion of the frequency spectrum in the millimeter-wave frequency range, which technically ranges from about 30 GHz to 300 GHz. Recent 5G NR studies have focused on the bandwidth available at mmWave frequencies between 24 GHz and 100 GHz. Signals in the mmWave frequency range can be easily absorbed by objects in their propagating path, such as buildings, trees, and human body parts. Successfully dealing with phase noise has been another issue in designing mmWave communication systems. When severe phase noise is present in a communication link, the link performance can be substantially degraded. The time unit to obtain phase noise estimates determines the ultimate bound within which the receiver is able to correct phase noise. However, mmWave signals also promise many benefits, such as greater bandwidth, capacity, faster transmission speeds, and smaller antennae. Thus, it would be desirable to utilize techniques to compensate for phase noise in a reliable fashion for mmWave communications.

In Rel-15, a Phase Tracking Reference Signal (PT-RS or PTRS) was specified for both downlink and uplink communications, specifically for Cyclic Prefix-Orthogonal Frequency Division Multiplexing (CP-OFDM) and Discrete Fourier Transform spread Orthogonal Frequency Division Multiplexing (DFT-S-OFDM). However, prior art approaches to PTRS for CP-OFDM are not conducive to estimating phase noise at a time unit smaller than an individual OFDM symbol's duration. Thus, the techniques disclosed herein may be used to embed one or multiple bands with DFT-S-OFDM PTRS design in the data allocation bandwidth of an OFDM transmission.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various embodiments is considered in conjunction with the following drawings, in which.

Figure 1:
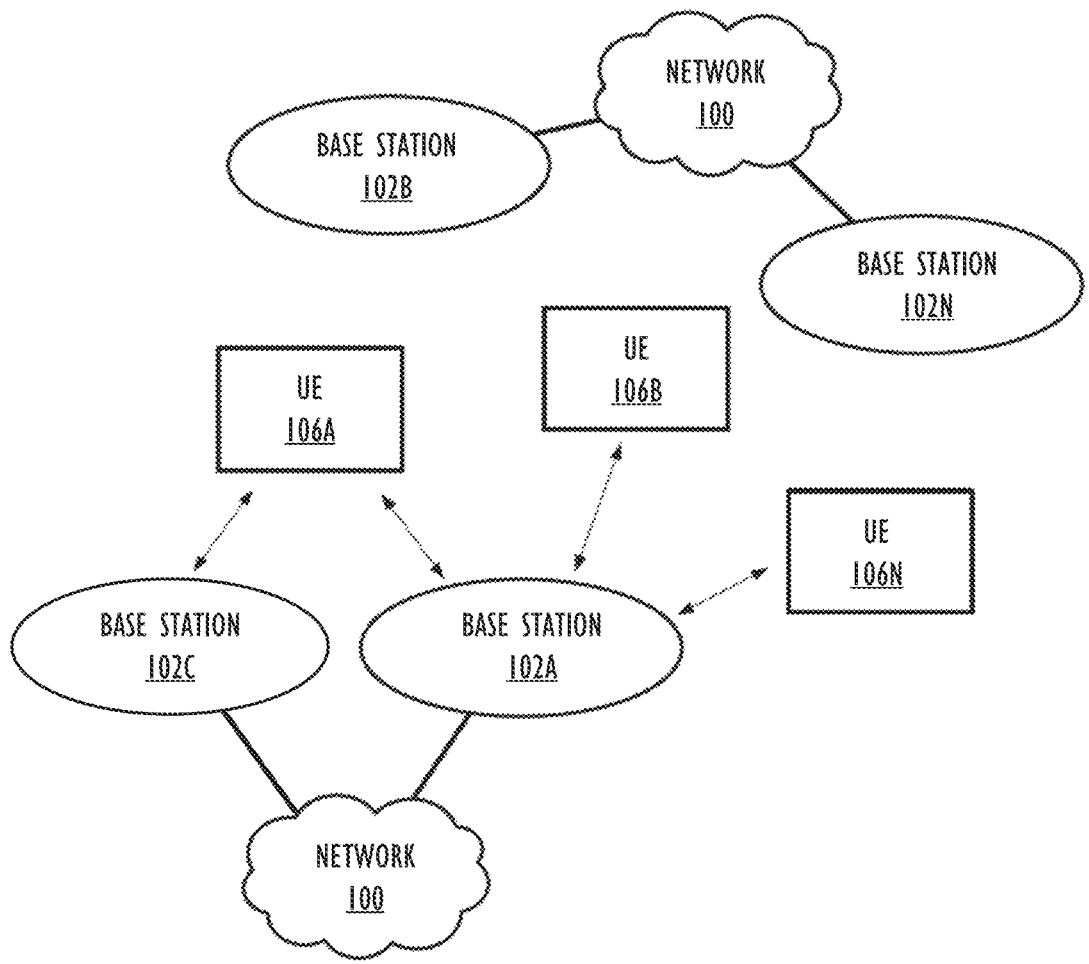
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In certain wireless communications scenarios, e.g., so-called mmWave scenarios, the successful handling of phase noise may be important to successful uplink and downlink communications. Thus, according to some embodiments disclosed herein, in a CP-OFDM based transmission, one or multiple bands with DFT-S-OFDM based PTRS is/are embedded in a transmitted signal.

For example, assuming the Physical Downlink Shared Channel (PDSCH) and/or Physical Uplink Shared Chanel (PUSCH) allocation in a given wireless communication system consists of some number, N, physical resource blocks (PRBs), according to some embodiments disclosed herein, there may be N_b PTRS bands defined within the N PRBs; N_c contiguous PRBs within each PTRS band, and the N_b PTRS bands may be evenly distributed within the N PRBs.

With the introduction of such PTRS bands, a receiver device, such as a User Equipment (UE) device, or a transmitter device, such as a gNodeB (gNB), may perform steps in accordance with the following procedure: using narrow band filters for the PTRS bands for the incoming quadrature (IQ) samples to extract each frequency band containing a PTRS; then, exploiting the time domain or frequency domain processing to obtain the time domain PTRS signal, which may undergo phase noise effects at both the gNB and UE. With the various waveforms proposed herein, the phase noise at the gNB/UE does not destroy the orthogonality of signals that are mapped to different time samples.

Once the phase noise estimates at sub-time units are obtained from each PTRS band, they may be combined from estimates from other PTRS bands to come up with more reliable estimates. Alternately, a joint estimation can be conducted across all PTRS bands, so that a joint estimate is obtained for each sub-time unit. Other alternatives are also possible, such as using groupings of PTRS bands, etc. After the sub-time units are established, interpolation and/or smoothening may be used to obtain estimates for even finer time units. With any approach, the phase noise estimates for sub-time units may then be applied to the IQ samples to compensate phase noise, and then FFT can be applied to the compensated signal for further frequency domain processing.

As will be explained further herein, various techniques may also be employed to allow for the multiplexing of PTRS for multiple UEs on the same physical resources.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device, a computer system memory or random access memory such as DRAM, DDR RAM, SRAM, EDO RAM. Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Turning now to FIG. 1, a simplified example of a wireless communication system is illustrated, according to some embodiments. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE. LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB." In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Figure 2:
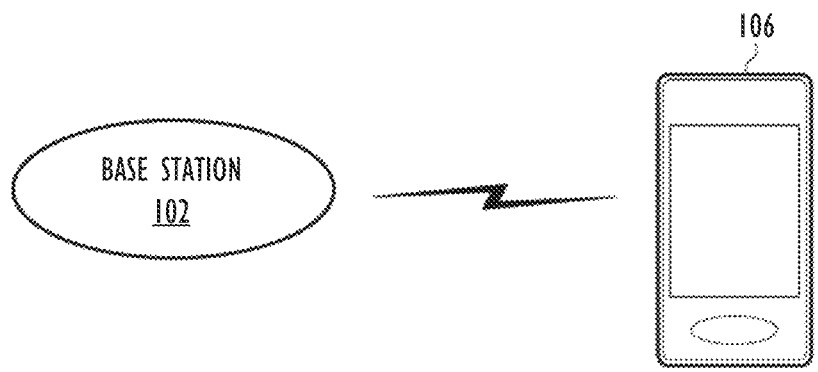
FIG. 2 illustrates a base station (BS) in communication with a user equipment (UE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
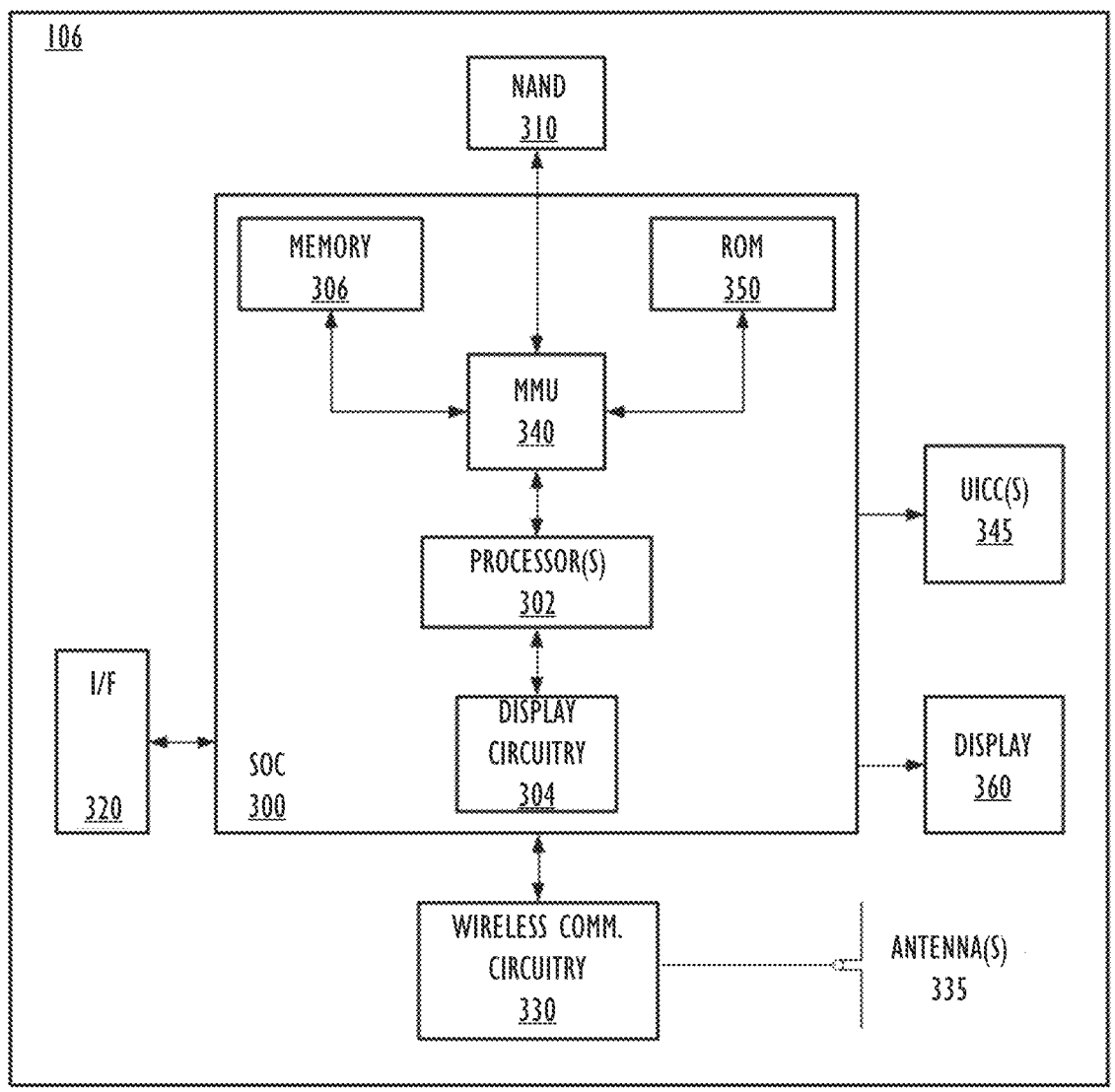
FIG. 3 illustrates an example block diagram of a UE, according to some Embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS. GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some embodiments, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
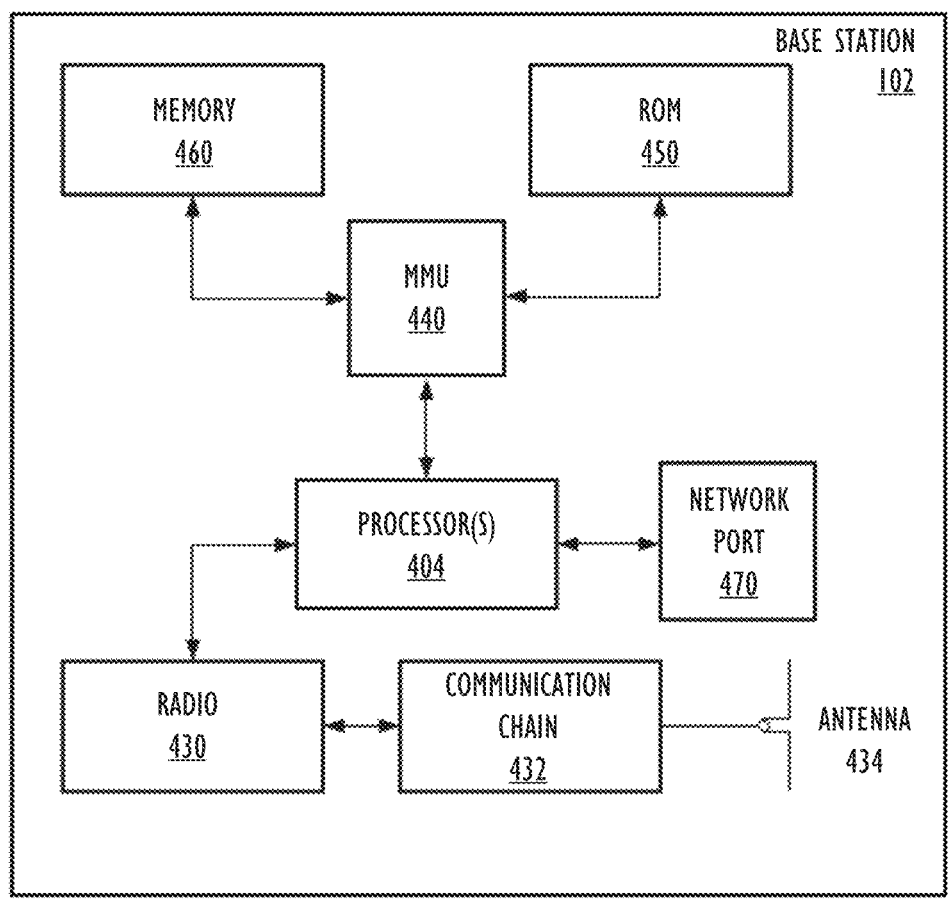
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB." In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE. LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein. e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
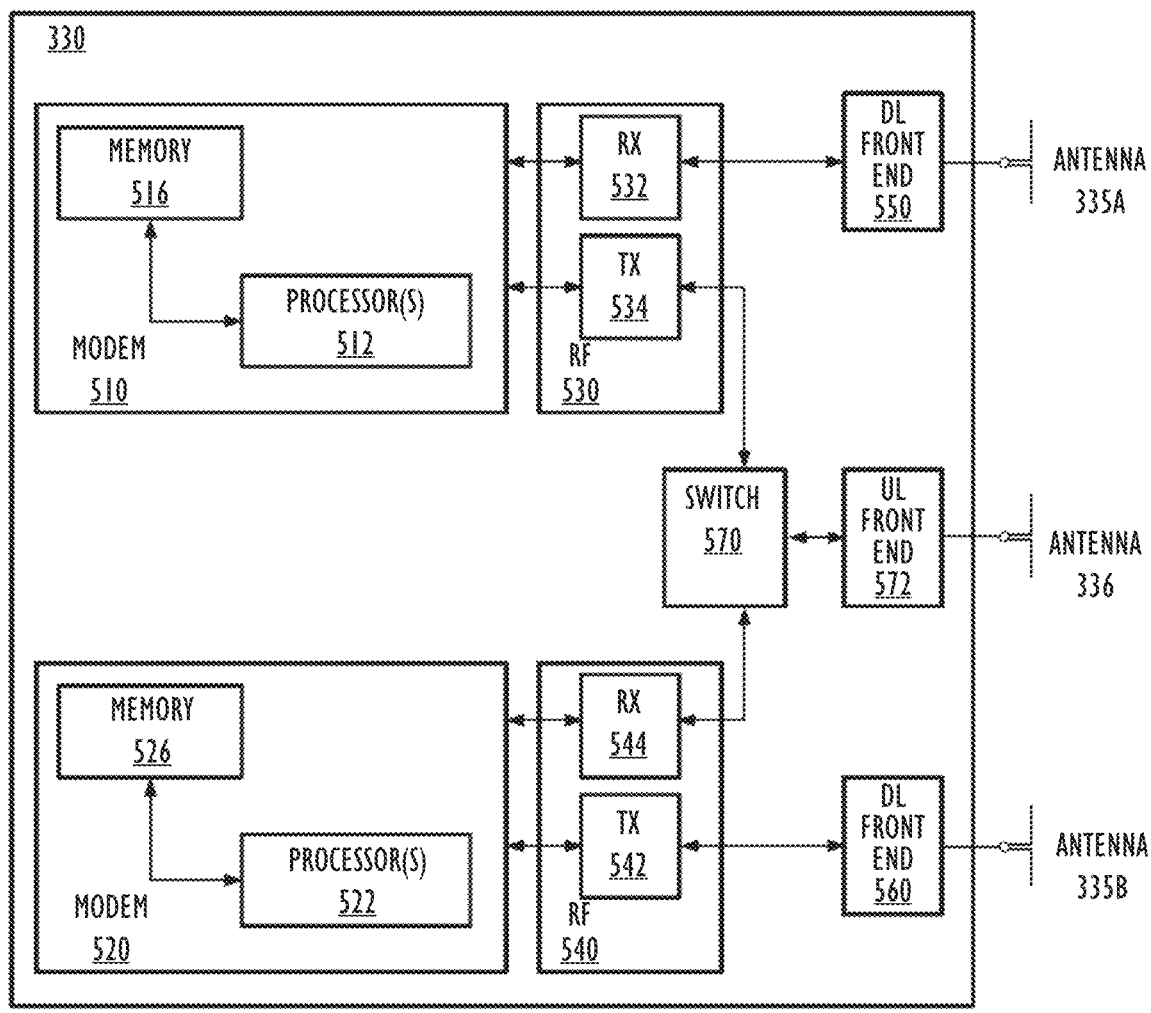
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
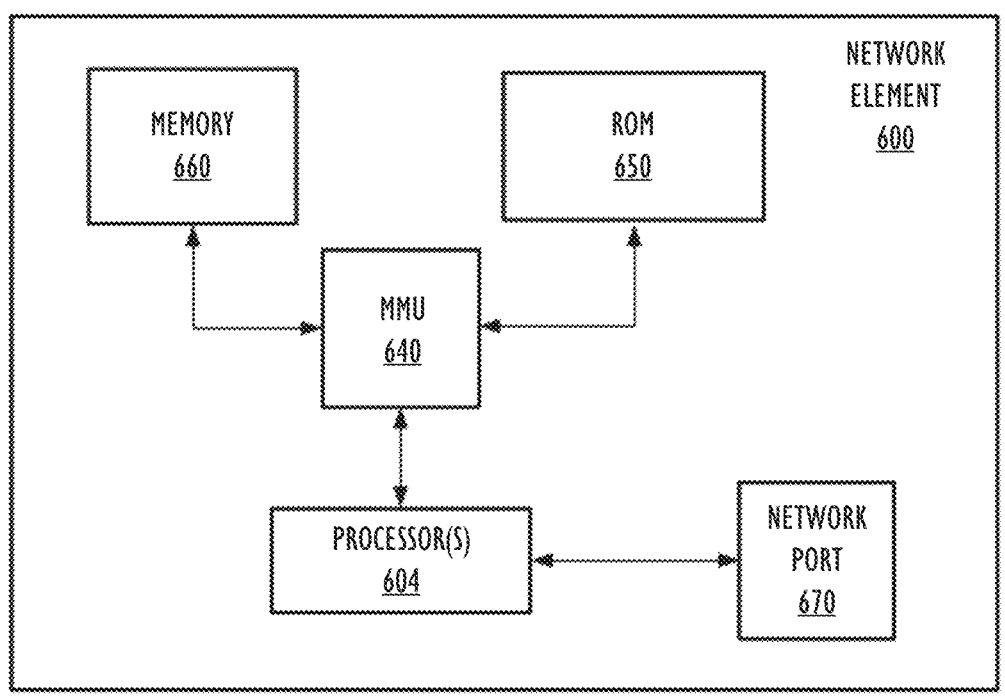
FIG. 6 illustrates an example block diagram of a network element, according to some embodiments.

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
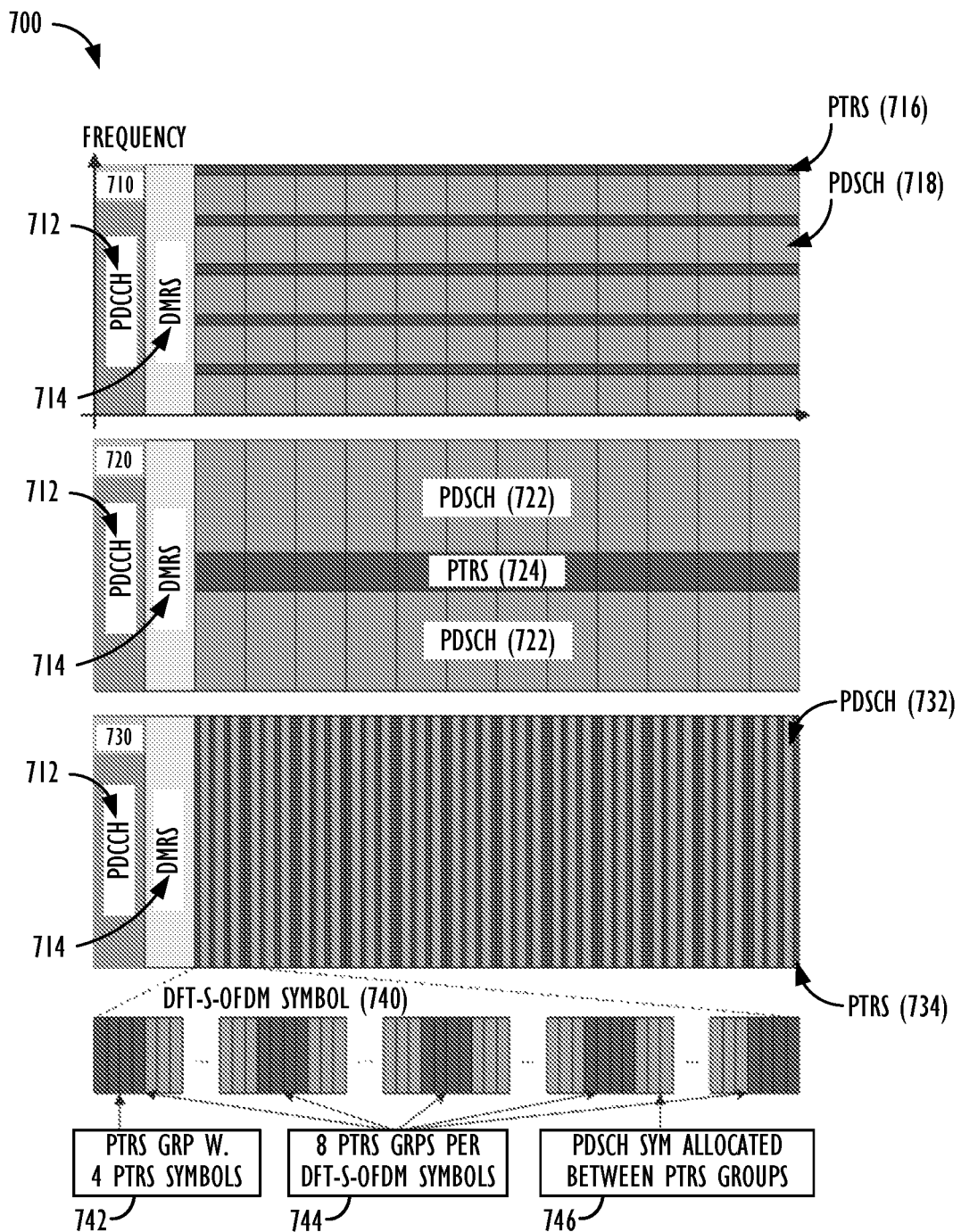
FIG. 7 illustrates exemplary proposed PTRS structures for OFDM and DFT-s-OFDM transmissions, in accordance with aspects of the prior art.

Turning now to FIG. 7, exemplary proposed PTRS structures 710/720/730 for OFDM and DFT-s-OFDM transmissions 700 are illustrated, in accordance with aspects of the prior art. In each of structures 710/720/730, the vertical axis represents frequency, and the horizontal axis represents time. Structure 710 illustrates an OFDM signal, wherein the structure begins with the transmission of the PDCCH 712 across all frequencies, followed by the DMRS 714 across all frequencies. Next, the PTRS 716 is transmitted across specified, evenly-spaced frequency bands, while the PDSCH 718 is transmitted over the remaining frequency bandwidth.

Structure 720 illustrates another exemplary OFDM signal, wherein the structure begins with the transmission of the PDCCH 712 across all frequencies, followed by the DMRS 714 across all frequencies. Next, the PTRS 724 is transmitted across a single, centrally-located frequency band, while the PDSCH 722 is transmitted over the remaining frequency bandwidth.

Structure 730 illustrates another exemplary DFT-s-OFDM signal, wherein the structure begins with the transmission of the PDCCH 712 across all frequencies, followed by the DMRS 714 across all frequencies. Next, the PTRS 734 is transmitted in groups of symbols distributed across the transmission of the PDSCH 732. As is further illustrated in box 742, according to exemplary structure 730, the PTRS group comprises 4 PTRS symbols. As is further illustrated in box 744, according to exemplary structure 730, there are 8 PTRS groups per DFT-s-OFDM symbol. As is further illustrated in box 746, according to exemplary structure 730, the PDSCH symbols are allocated between the PTRS groups.

In structure 720, although the receiver may be able to estimate the phase noise at a sub-OFDM symbol level in an implementation-specific way, the receiver processing is still somewhat complicated, e.g., due to the fact the time domain representation of PTRS signal 724 may not have any structure. Thus, further benefits could be obtained via different PTRS designs, such as those presented in the embodiments described herein.

PTRS Insertion Scheme

Figure 8:
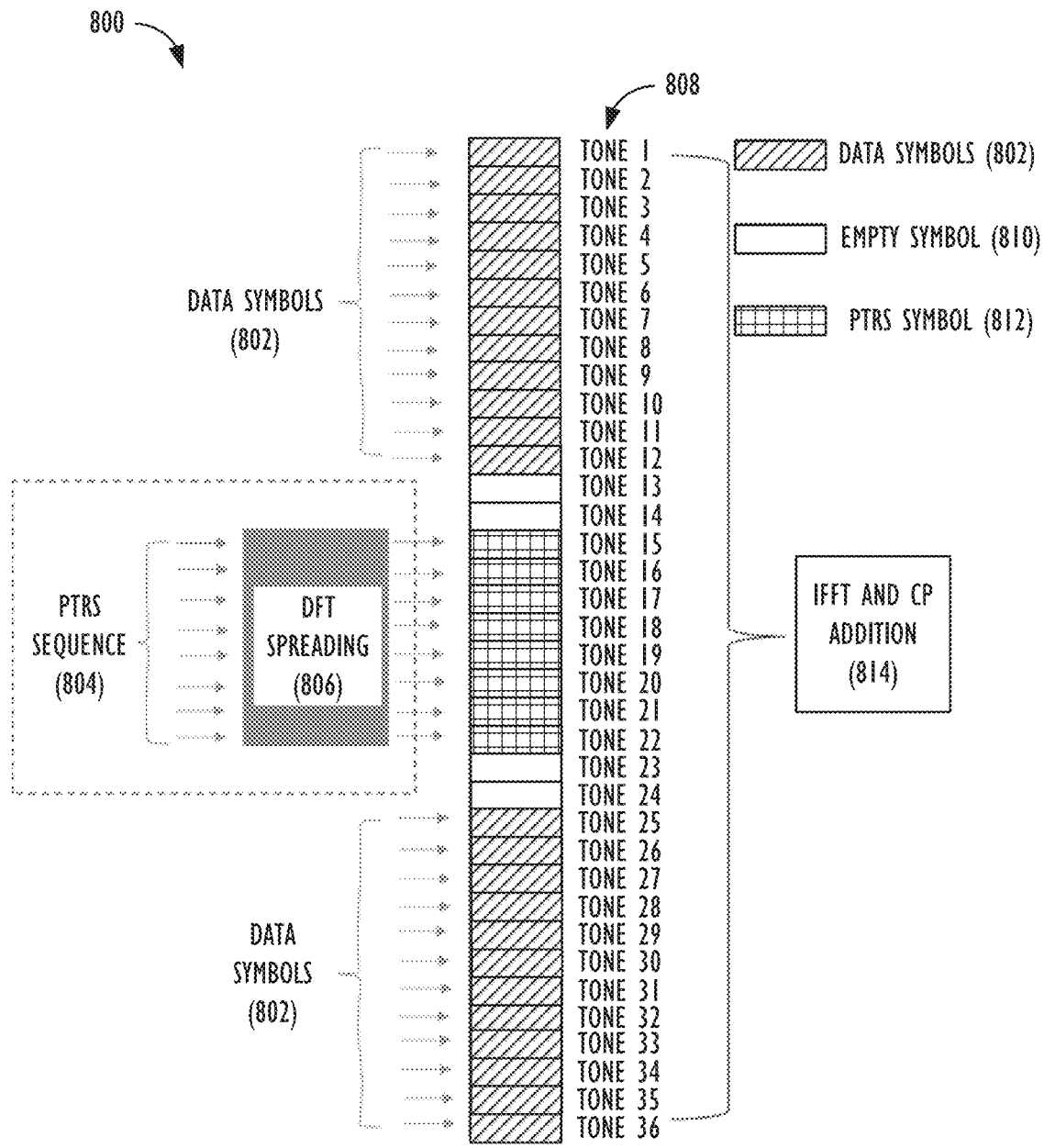
FIG. 8 illustrates an example PTRS insertion scheme for CP-OFDM transmissions, in accordance with aspects of the present disclosure.

FIG. 8 illustrates an example PTRS insertion scheme 800 for CP-OFDM transmissions, in accordance with aspects of the present disclosure. As illustrated in FIG. 8, data symbols 802 are spread evenly across a given frequency bandwidth, and divided into evenly-spaced tones 808, In the exemplary scheme 800, tones 1-12 and 25-36 represent data symbols 802, while tones 13-14 and 23-24 are left as empty symbol tones 810 and serve as guard bands, and tones 15-22 are used as the PTRS symbols 812 for the spreading of the PTRS sequence 804. It is to be understood that the use of empty symbol tones 810 is optional and may be omitted in some embodiments, e.g., if not needed to enhance receiver processing capabilities. In NR design, the CP-OFDM waveform enjoys several benefits over the DFT-s-OFDM waveform. For example, in the downlink, the CP-OFDM waveform allows for the multiplexing of various signals/channels, such as CSI-RS and PDSCH, and, in the uplink, the CP-OFDM waveform allows for the multiplexing of UCI (Uplink Control Information) and PUSCH. In accordance with embodiments disclosed herein, a PTRS insertion scheme where DFT-s-OFDM waveforms are embedded within a CP-OFDM signal retains the benefits of CP-OFDMs, while also benefitting from the improved phase noise estimation/compensation possible with DFT-s-OFDM-based PTRS.

The PTRS signal, represented as PTRS sequence 804 may be spread. e.g., via DFT spreading block 806, embedded in the OFDM signal, e.g., using DFT-s-OFDM techniques, and transmitted across the aforementioned PTRS symbols 812, located at tones 15-22, before having an IFFT applied and CP added at block 814.

As mentioned above, according to some embodiments, the PDSCH/PUSCH allocation may consist of N PRBs, with N_b PTRS bands within each of the N PRBs; and N_c contiguous PRBs within each PTRS band, and the N_b PTRS bands may be distributed, e.g., evenly distributed within the N PRBs. With the introduction of the PTRS bands, the UE receiver may then perform the following procedure: 1) using narrow band filters for PTRS bands for the incoming quadrature (IQ) samples to extract each frequency band containing PTRS band, then 2) time domain (or frequency domain) processing may be exploited to obtain the time domain PTRS signal, which may undergo phase noise effects at both gNB and UE. Note, however, that with the proposed waveform 800, the phase noise at gNB/UE does not destroy the orthogonality of signals that are mapped to different time samples.

According to some embodiments, once the phase noise estimates at sub-time units are obtained from each PTRS band, they may be combined from estimates from other PTRS bands to come up with more reliable estimates. Alternately, a joint estimation process can be performed across all PTRS bands, so that a joint estimate of phase noise is obtained for each sub-time unit. Other alternatives are also possible, such as grouping of PTRS bands, etc. After the sub-time units are established, interpolation and/or smoothening may be used to obtain estimates for even finer time units. With any approach, the phase noise estimates for sub-time units are then applied to the IQ samples to compensate phase noise, and then the then FFT can be applied to the compensated signal for further frequency domain processing. In order to allow multiplexing UEs on the same resources and/or to reduce signaling overhead, the location of the respective PTRS bands may be derivable with respect to a common resource block.

As the PTRS for DFT-S-OFDM offers multiple opportunities to estimate phase noise, if the time domain formulation is used, it may be assumed that, at each OFDM symbol where PTRS is presented, DFT spreading (e.g., with N_t points) is applied to the PTRS sequence, and the resulting signal is mapped to N_t tones over N_c PRBs, where N_t≤12×N_c. If N_t<12×N_c, some guard tones/empty tones may be reserved at the two edges of the contiguous tones over which the PTRS sequence is mapped. In one example, N_c=4, and N_t=40, so, within the 8 PRBs of the PTRS band, the top 4 tones and the bottom 4 tones may be reserved and not used by either PTRS or any other signal/data, which makes the narrow band filtering easier at the receiver, as discussed above.

There are multiple choices of signals that may be used for the PTRS signal, e.g., the LTE/NR extended Zadoff-Chu (ZC) signal, the non-extended ZC signal, such as constant amplitude zero autocorrelation waveform (i.e., CAZAC sequences), which has flat time domain representation and also flat frequency domain representation, the Gold sequence, or pi/2-BPSK sequences, e.g., derived from a Gold sequence. According to some embodiments, the flat time domain representation and frequency domain representation of the non-extended ZC signal make it an ideal choice for this usage.

Orthogonal Cover Sequences

Figure 9:
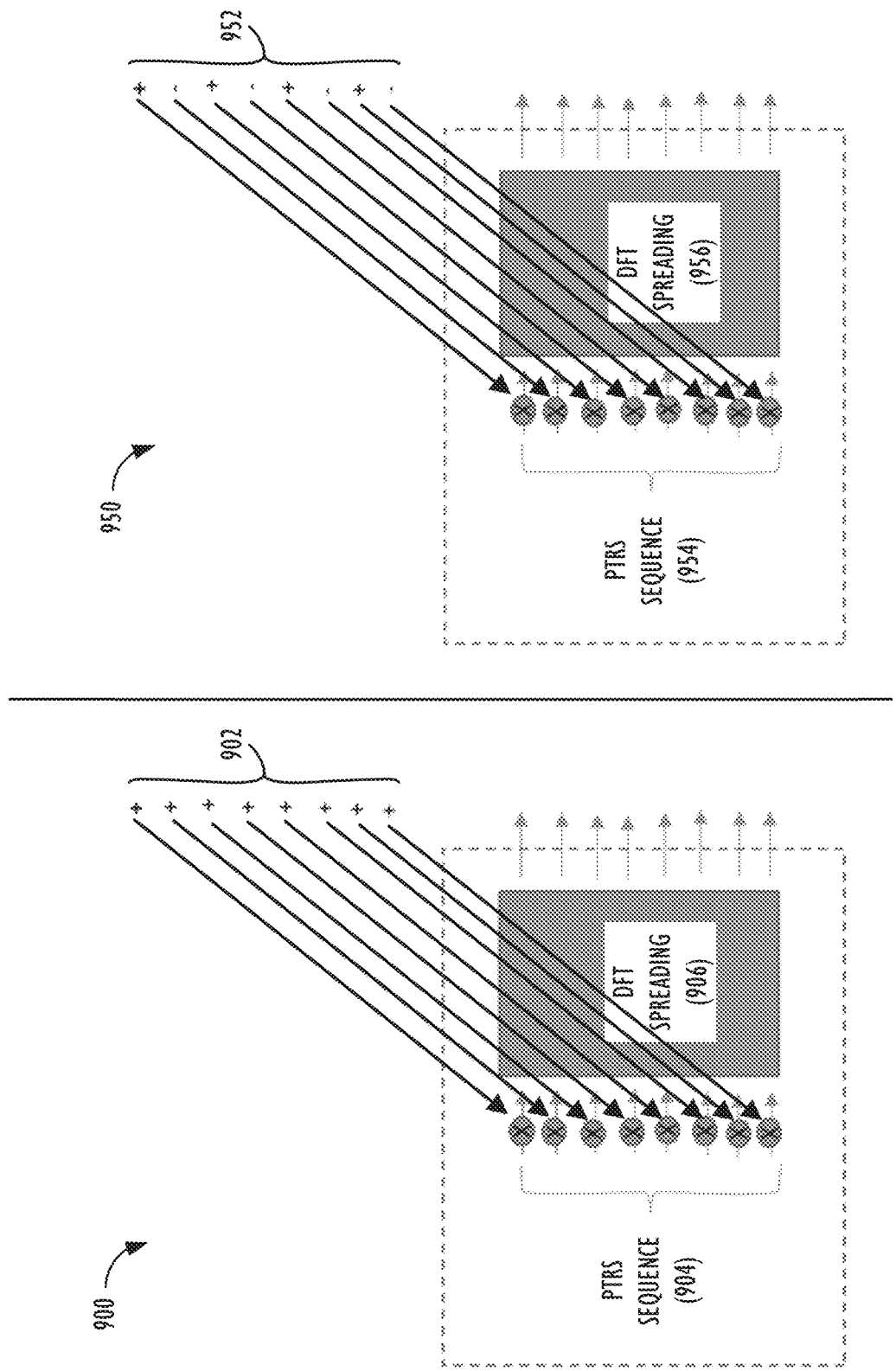
FIG. 9 illustrates example orthogonal cover schemes for PTRS ports, in accordance with aspects of the present disclosure.

FIG. 9 illustrates example orthogonal cover schemes 900/950 for multiple PTRS ports (e.g., as may be used in a MIMO transmission scheme having multiple layers associated with different frequency sources and, hence, with different phase noises), in accordance with aspects of the present disclosure. PTRS ports can be understood as logical ports defined based on combinations of available antennas, antenna elements, beams, layers, etc. that may be used to transmit or receive a signal. In scheme 900, the PTRS sequence 904 is covered by orthogonal sequence 902 (i.e., [++++++++]) before being spread by DFT spreading block 906, while, in scheme 950, the PTRS sequence 954 is covered by orthogonal sequence 952 (i.e., [+−+−+−+−]) before being spread by DFT spreading block 956. As may be understood, as long as orthogonal cover sequences are used, e.g., sequences derived from a unitary matrix, such as Walsh-Hadamard sequences, Fourier sequences derived from a Fourier transform matrix, etc., the PTRS for multiple UEs may be multiplexed together on the same PRBs.

Orthogonalized Time Domain Resource Partitioning

Figure 10:
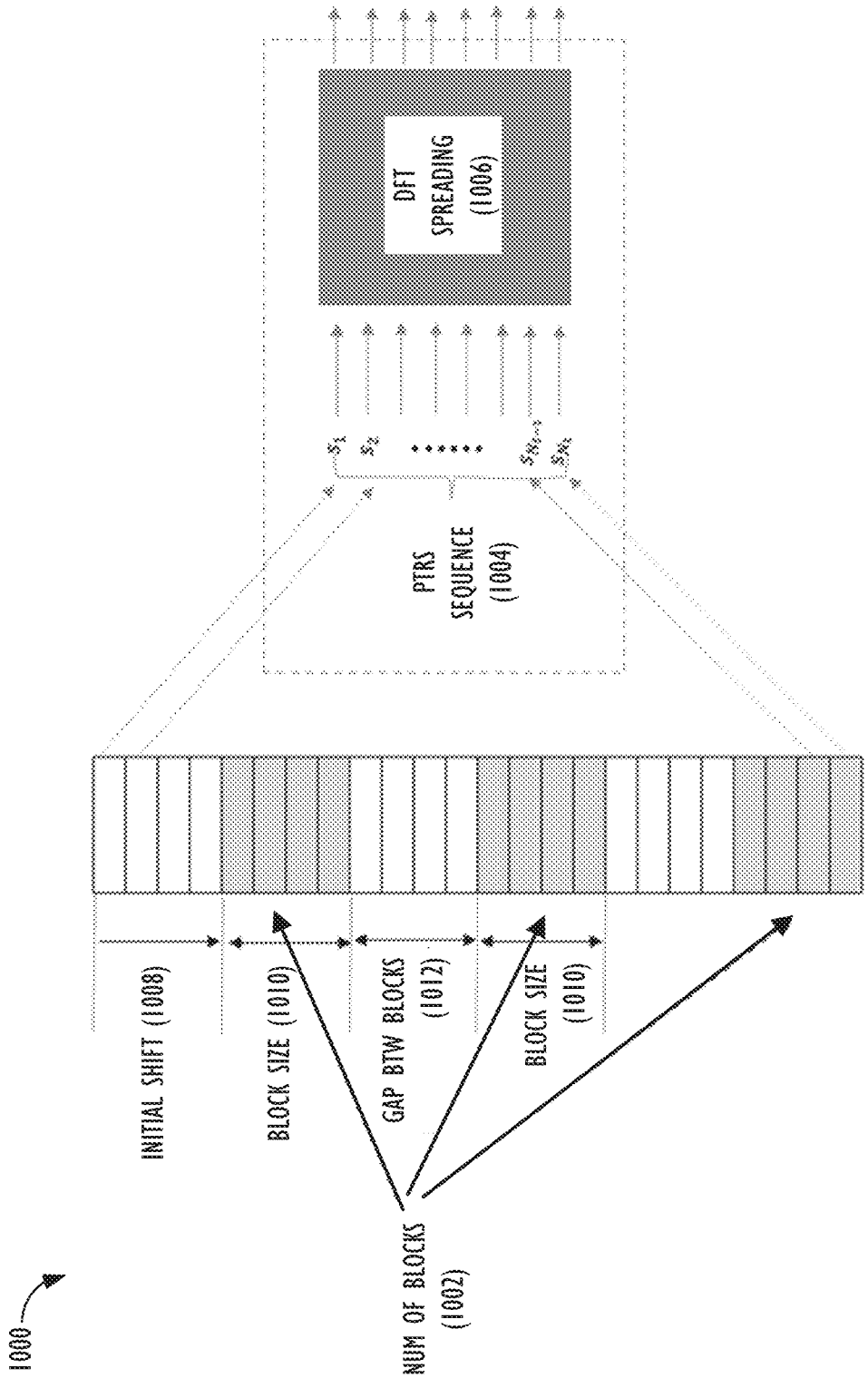
FIG. 10 illustrates an example PTRS insertion scheme for CP-OFDM transmissions using blocks, in accordance with aspects of the present disclosure.

FIG. 10 illustrates an example PTRS insertion scheme for CP-OFDM transmissions using blocks 1000, in accordance with aspects of the present disclosure. As illustrated in FIG. 10, according to some embodiments, it is also possible for that different PTRS ports occupy different "blocks" in the time domain. For example, among the N_t time domain samples, port 1 may occupy samples 1, 3, 5, 7, . . . , while port 2 occupies samples 2, 4, 6, 8, . . . ; or port 1 may occupy samples 1-4, 9-12, . . . , while port 2 occupies samples 5-8, 13-16, . . . or port 1 may occupy samples 1-4, 13-16, . . . , while port 2 occupies 7-10, 19-22, . . . . In other words, the time domain samples may be spaced, so that there is a gap between "chunks" of resources occupied by different PTRS ports.

In general, for a given PTRS port, the PTRS sequence 1004 can be characterized by a few parameters, as shown below:

Initial shift (1008), which may be predetermined based on a set of rules, which specifies the first PTRS sequence sample that is non-zero;

Block size (1010), which gives a block of adjacent PTRS sequence samples that are non-zero;

Gap between blocks (1012), which gives a number of adjacent PTRS sequence samples that are zero; and the overall Number of blocks (1002), which can be used to limit the number of blocks to be less than: floor [(Nt−(initial shift))/((block size)+(gap between blocks))]

As may now be understood, using these techniques for downlink, the gNB may multiplex the PTRS transmissions for two (or more) UEs before applying DFT spreading at block 1106, wherein the first UE's PTRS occupies some blocks, and the second UE's PTRS occupies other blocks. The same multiplexing techniques may be also utilized for uplink, e.g., transmissions from a UE to a gNB.

Figure 11A:
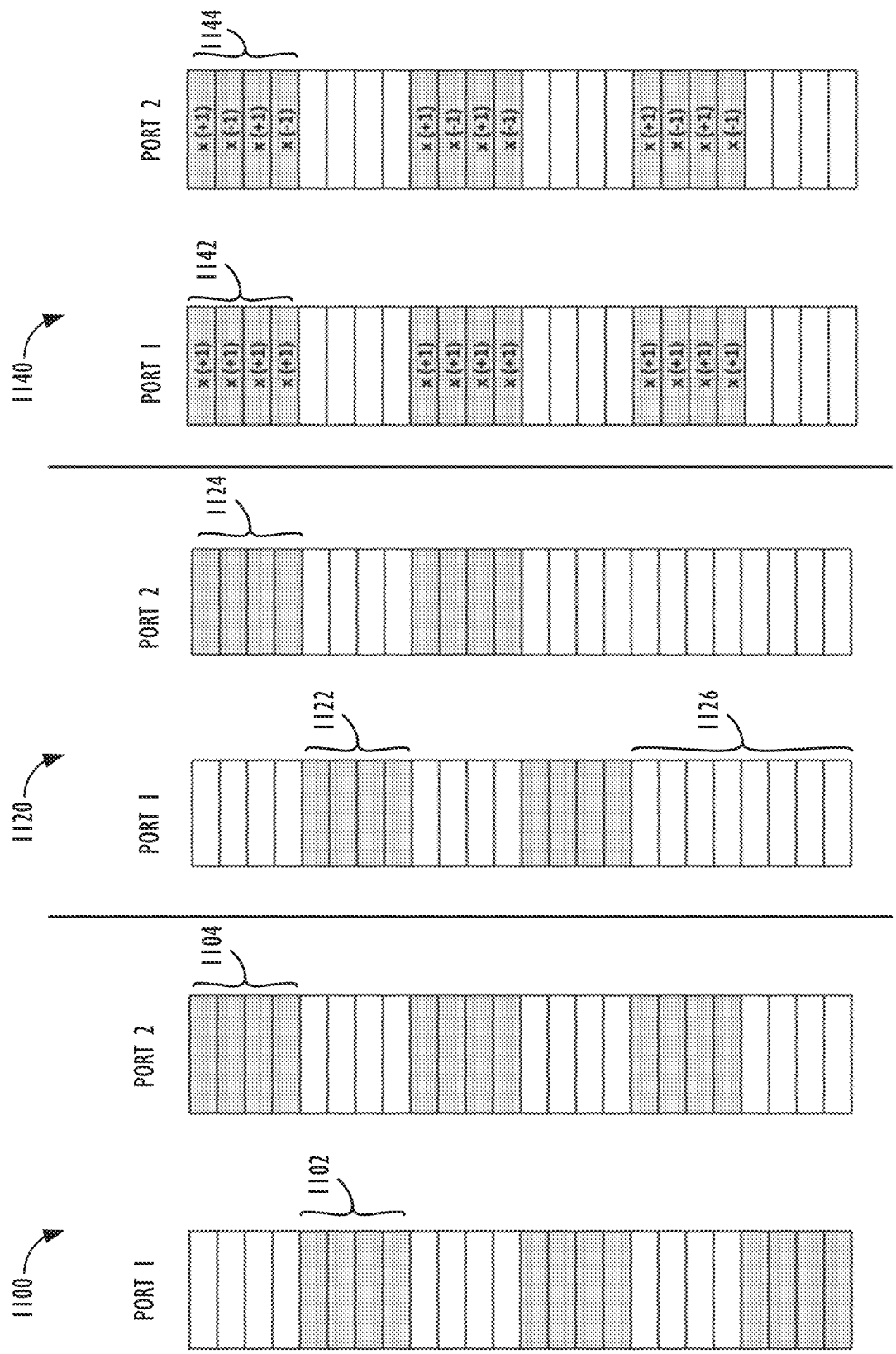
FIGS. 11A and 11B illustrate example PTRS port multiplexing schemes, in accordance with aspects of the present disclosure.
Figure 11B:
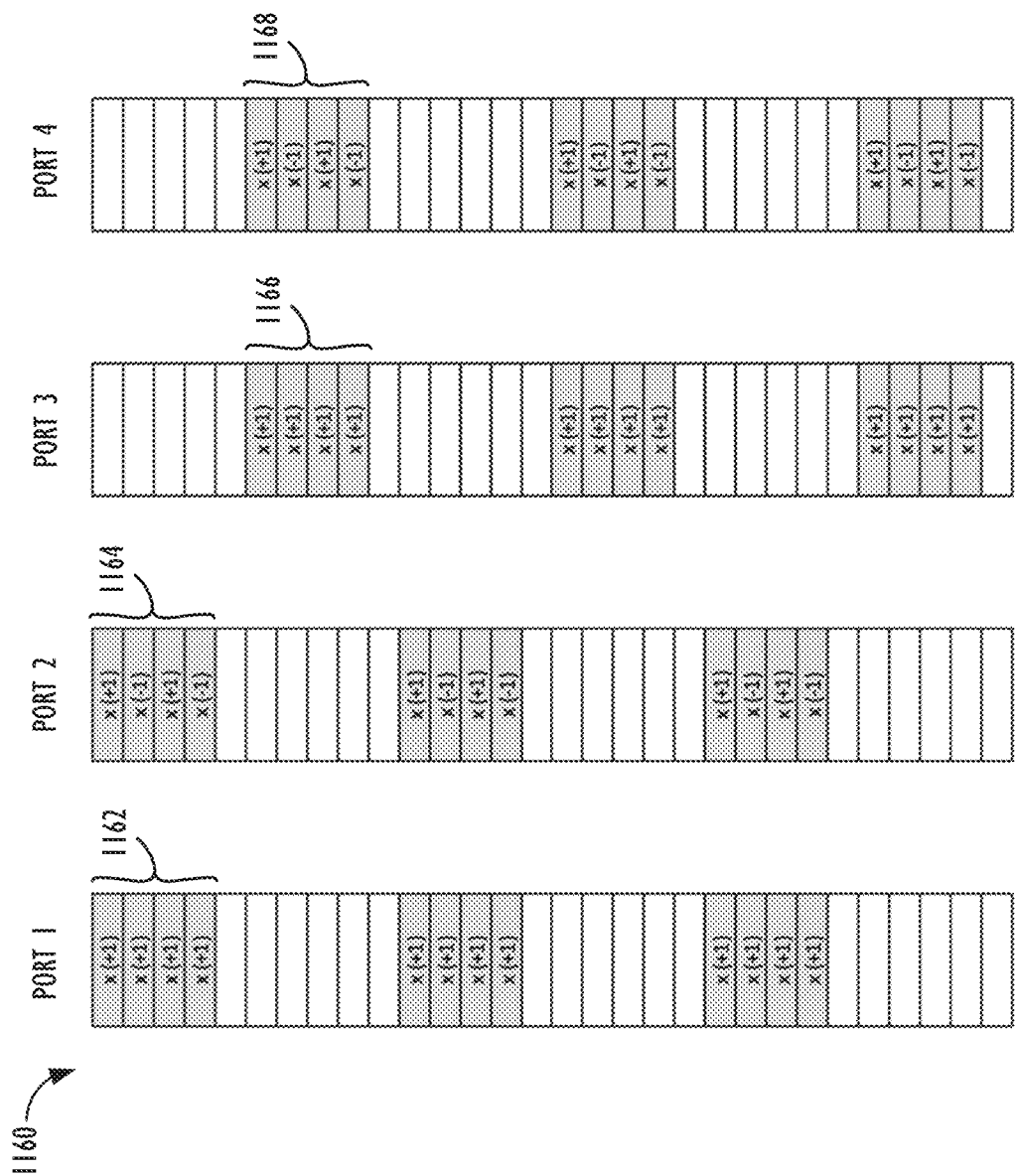

FIGS. 11A and 11B illustrate example PTRS port multiplexing schemes, in accordance with aspects of the present disclosure. Note that, not all parameters may be necessary to fully characterize a PTRS sequence. For example, in some embodiments, an initial shift can be set to 0 for Port 1, and for Port 2 initial shift may be set to "block size," as shown in FIG. 10. In another example, the number of blocks is derived from [(Nt−(initial shift))/((block size)+(gap between blocks))], also shown in FIG. 10. In yet another example, the "Gap between blocks" may be set equal to "block size," as shown in both FIG. 10 and FIG. 11A.

In example 1100 of FIG. 11A, the location of blocks utilized may be different for port 1 (1102) than it is for port 2 (1104). e.g., due to the use of different initial shift values, w % bile no samples are reserved for use by another UE. In the example of 1120 of FIG. 11A, the location of blocks utilized may also be different for port 1 (1122) than it is for port 2 (1124), e.g., due to the use of different initial shift values, but, by contrast with example 1120, some samples (1126) are also reserved for use by another UE. In example 1140 of FIG. 11A, it is demonstrated that, even in the event that the same blocks (1142) are utilized for port 1 as are used for port 2 (1144), multiple UEs may still be multiplexed, e.g., via the use of orthogonalized cover sequences, e.g., Walsh-Hadamard sequences.

It is also possible that "Gap between blocks" (1012) may be set larger than "block size" (1010) to help deal with cross-talk, e.g., due to multipath between PTRS ports. As illustrated in FIG. 11B, in one example, Port 1 and Port 3 have a "Gap between blocks" value=6, and a "Block size"=4; Port 3 starts with the initial shift at "gap between blocks"−1; and Port 1 starts with the initial shift at 0 in FIG. 11B, so that the cross-talk between Port 1 and Port 3 due to multipath spread plus the "block size" is no larger than "gap between blocks," and the phase estimate for each PTRS port does not need to consider the cross talk from another PTRS port. As may be understood, any combinations of the above rules may also be used, according to certain embodiments.

It is also possible to combine the use of orthogonal cover and orthogonalized time domain partitioning to derive even further PTRS ports, e.g., by using the schemes illustrated in FIG. 11B, whereby a first orthogonal cover sequence (1162), e.g., ++++, is used for Port 1, and a different, second orthogonal cover sequence (1164), e.g., +−+−, is used for Port 2 (i.e., the ports that share overlapping blocks), while the first orthogonal cover sequence (1166) is used for Port 3, and the different, second orthogonal cover sequence (1168) is used for Port 4. Notably, because Ports ⅓ and Ports ⅔ do not share resources in the example of FIG. 11B, similar orthogonal cover sequences may be used for Ports ⅓ and for Ports ⅔, without causing cross-port interference.

Multiplexing of PTRS and DMRS

According to some other embodiments, there may be various options to multiplex a PTRS band and DMRS:

Option 1 for PTRS and PDSCH/PUSCH DMRS: DMRS and PTRS bands reside on different OFDM symbols.

Option 2 for PTRS and PDSCH/PUSCH DMRS: DMRS and PTRS bands can reside on the same OFDM symbols. In some embodiments, this may be achieved by having the PRBs occupied by PTRS bands be vacated by DMRS. (With this Option 2, phase noise on the DMRS-residing symbol can be also estimated at the sub-OFDM symbol level and compensated, which may lead to better channel estimates.) In one example:

N=3;
N_b=1;
N_c=1;
N_t=8.

In this example, data symbols may be directly mapped to tones 1-12, 25-36; 8 samples of the PTRS (e.g., with the Gold sequence) are mapped to a DFT spreading block first, and the output of the DFT spreading block may be mapped to 8 tones (e.g., tones 15-22). Note that, in this example, tones 13-14 and 23-24 are empty tones to facilitate narrow band filtering with the middle PRB.

Figure 12:
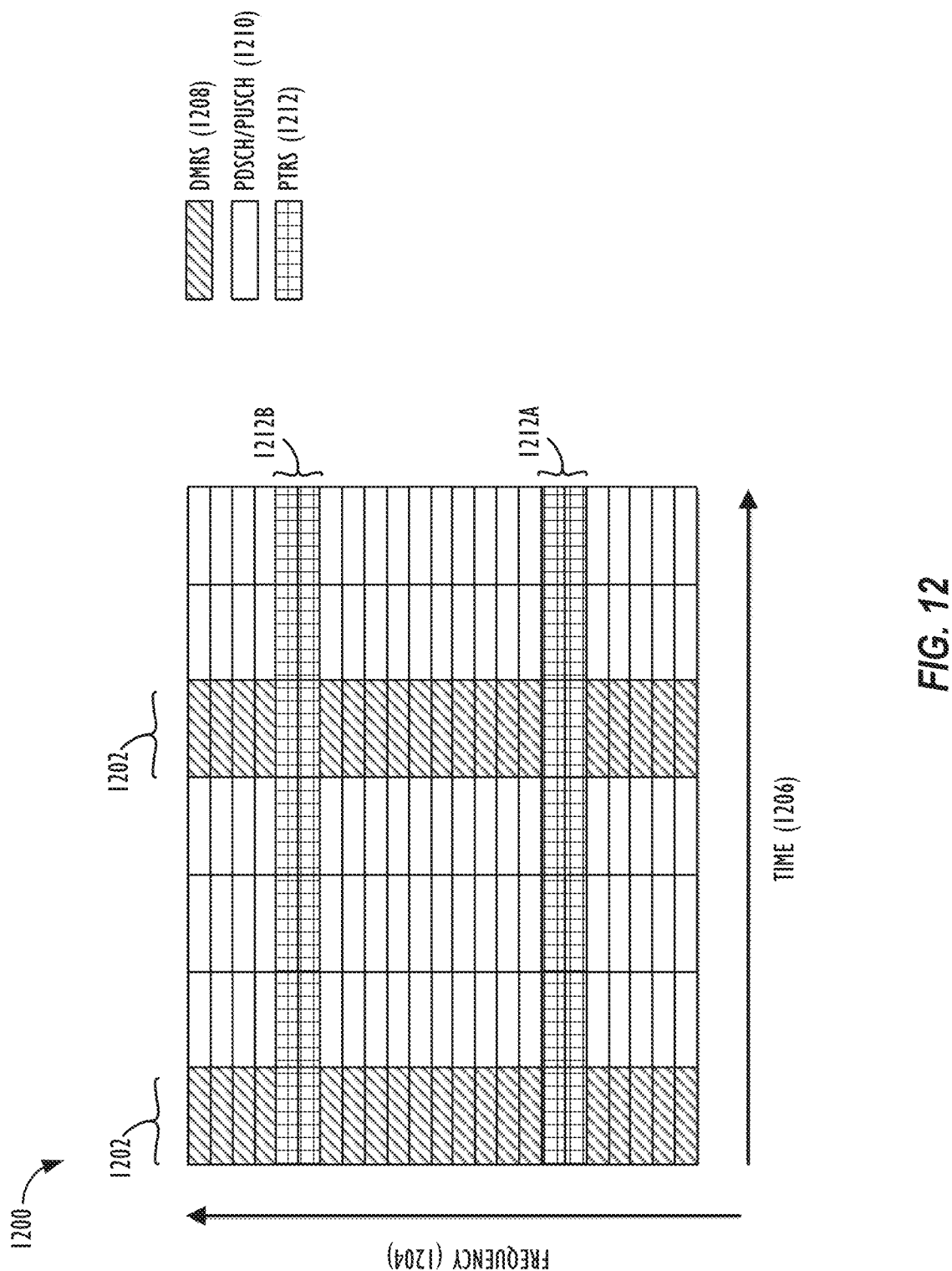
FIG. 12 illustrates an example scheme for multiplexing PTRS and Demodulation Reference Signal (DMRS) signals, in accordance with aspects of the present disclosure.

FIG. 12 illustrates another example scheme 1200 for multiplexing PTRS and Demodulation Reference Signal (DMRS) signals, in accordance with aspects of the present disclosure. In the example found in FIG. 12, the PRBs carrying DMRS (1202) are carried in the first and fifth symbols, while PDSCH/PUSCH data (1210) is carried on the second, third, fourth, sixth, and seventh symbols, while four designated frequency subcarriers transmit PTRS data (1212) across all symbols of the slot. Thus, according to this embodiment, at the frequency locations of the PTRS bands, the DMRS symbols may instead be replaced by PTRS information. It is to be understood that PTRS data (1212) may comprise one or more PTRS signals, according to a given embodiment. For example, PTRS data 1212 may comprise a single PTRS signal for two PTRS frequency bands (i.e., w % herein the same PTRS signal is identically used for two PTRS frequency bands, e.g., 1212*a* and 1212*b*), or the PTRS data 1212 may comprise a scenario wherein each PTRS frequency band (e.g., 1212*a* and 1212*b*) may carry its own (e.g., different) PTRS signal. As illustrated in FIG. 12, the horizontal axis indicates time (1206), and the vertical axis indicates frequency (1204).

Figure 13A:
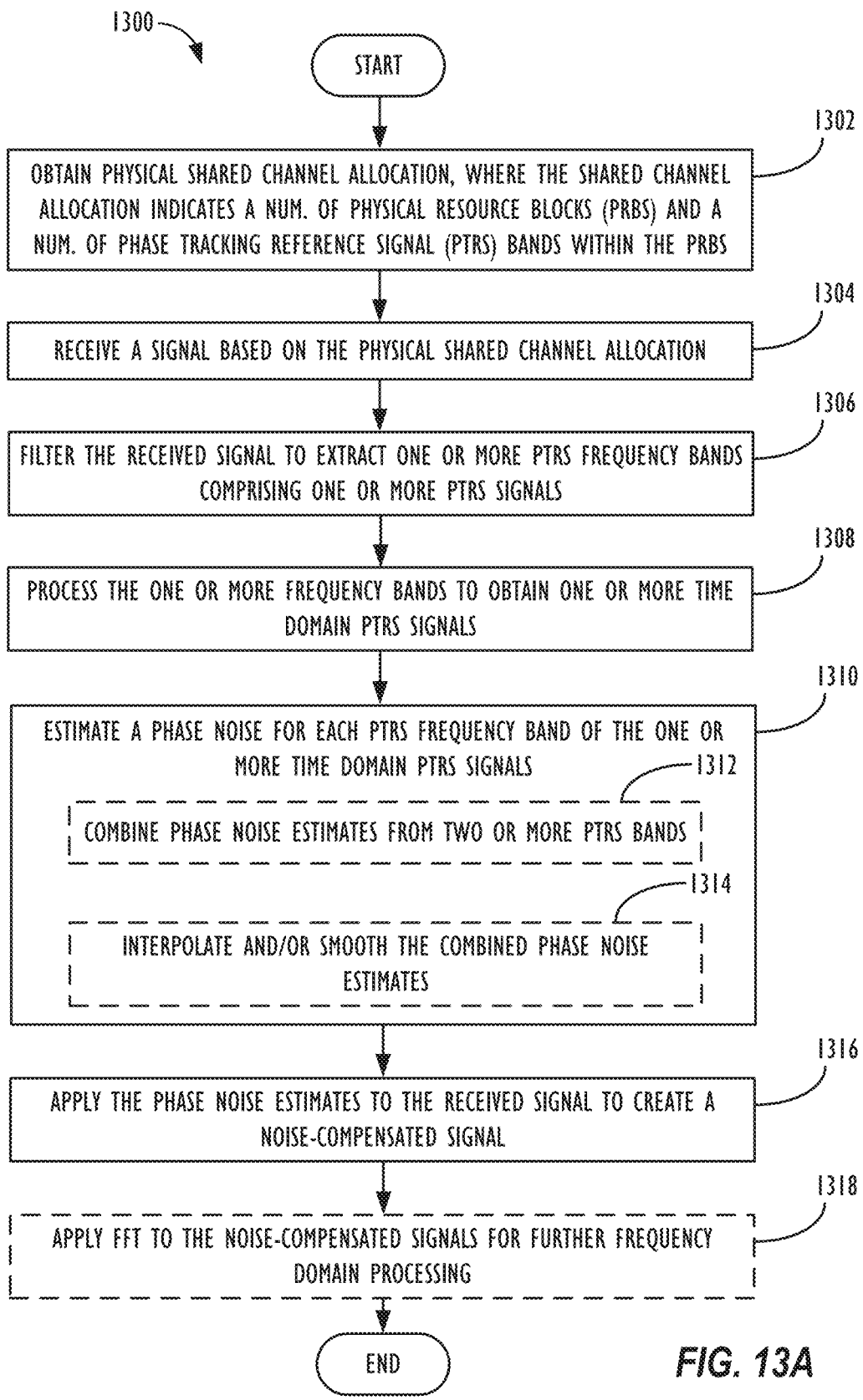
FIGS. 13A and 13B illustrate a technique for wireless communications, in accordance with aspects of the present disclosure.
Figure 13B:
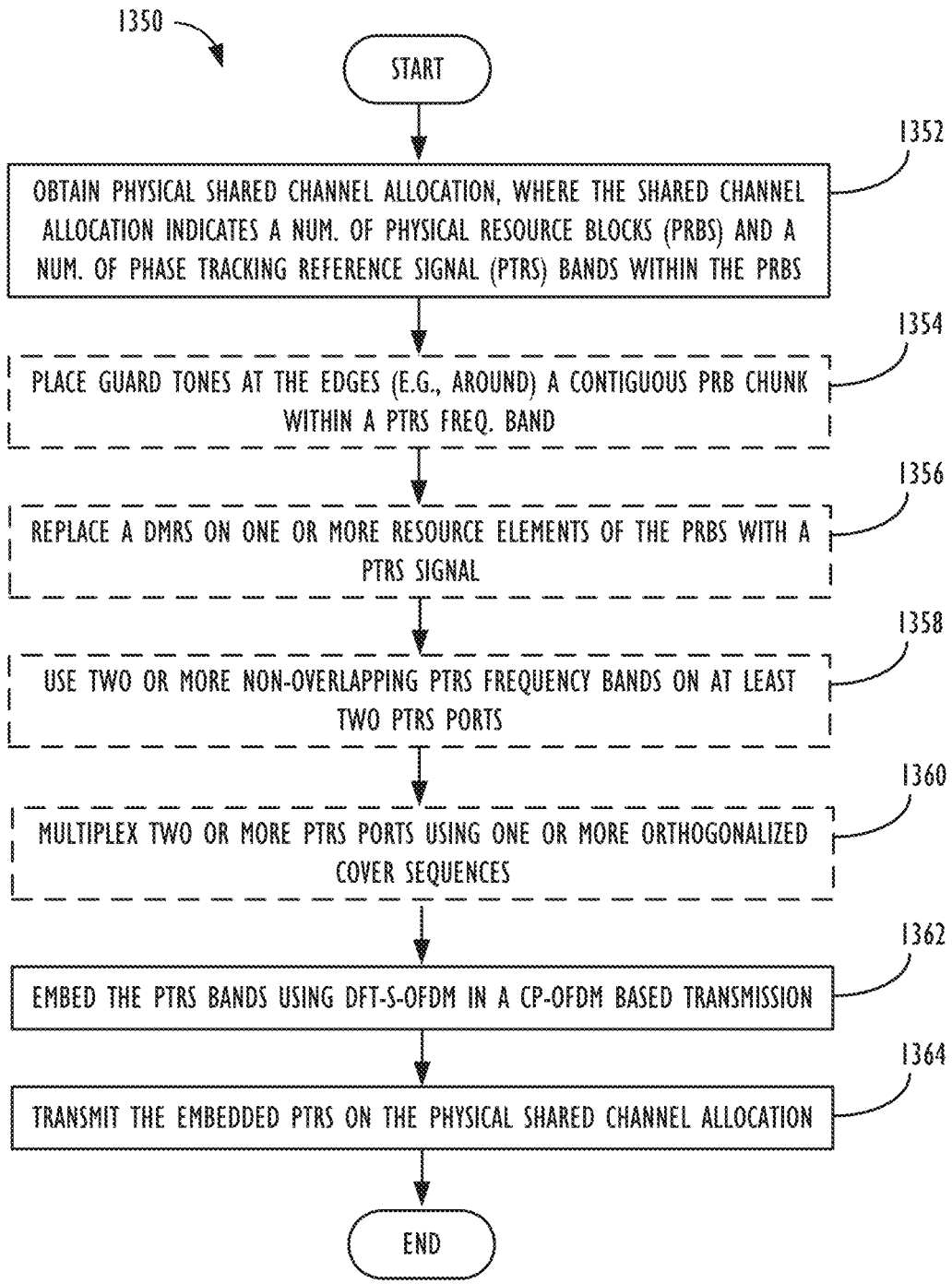

FIGS. 13A and 13B illustrate methods for wireless communications, in accordance with aspects of the present disclosure. In FIG. 13A, exemplary receiver behaviors 1300 are described. First, at step 1302, a physical shared channel allocation is obtained, where the shared channel allocation indicates a number of physical resource blocks (PRBs), and a number of phase tracking reference signal (PTRS) bands within the PRBs. For example, a PDSCH/PUSCH allocation may be obtained, the PDSCH/PUSCH allocation comprising N PRBs; N_b PTRS bands within the N PRBs; and N_c contiguous PRBs within each PTRS band, wherein the N_b PTRS bands are distributed within the N PRBs, for example, evenly-distributed or substantially evenly-distributed within the N PRBs.

Next, at step 1304, a signal based on the physical shared channel allocation is received. Next, at step 1306, the received signal may be filtered to extract one or more PTRS frequency bands containing the one or more PTRS signals. For example, narrow band filters may be used to filter PTRS bands for the incoming IQ samples to extract each frequency band containing a PTRS band.

At step 1308, the one or more frequency bands may be processed to obtain one or more time domain PTRS signal. For example, time domain (or frequency domain) processing may be applied to obtain the one or more time domain PTRS signals (which undergoes phase noise effects at both gNB and UE). At step 1310, a phase noise may be estimated for each PTRS frequency band of the one or more time domain PTRS signals. For example, phase noise estimates at sub-OFDM-symbol time units from each PTRS band may be obtained. According to some embodiments, as part of step 1310, the process may optionally, at step 1312, combine phase noise estimates from two or more PTRS bands. Likewise, at step 1314, the combined phase noise estimates may optionally be interpolated and/or smoothed, e.g., if finer time units, such as sub-OFDM-symbol time units, are desired. Next, at step 1316, the phase noise estimates may be applied to the received signal to create a noise-compensated signal. For example, the system may apply phase noise estimates to IQ samples to create noise-compensated signals. At step 1318, a FFT may be applied to the noise-compensated signals for further frequency domain processing.

In FIG. 13B, exemplary transmitter behaviors 1350 are described. First, at step 1352, a physical shared channel allocation is obtained, where, as described above, the shared channel allocation may indicate one or more of: a number of physical resource blocks (PRBs), a number of PTRS bands within the PRBs, and/or a specification of the number of contiguous PRBs in each band, etc.

Next, various optional processing steps may be applied to the one or more PTRS signals at the transmitter before they are transmitted to one or more receiver devices. For example, at step 1354, guard tones may be placed at the edges (e.g., around) a contiguous PRB chunk within a PTRS band. At step 1356, at least one of the one or more PTRS signals may replace a DMRS on one or more resource elements of the PRBs. At step 1358, two or more non-overlapping PTRS frequency bands, comprising at least two PTRS ports, may be used for the transmission. At step 1360, two or more of the PTRS ports may be multiplexed, e.g., using one or more orthogonalized cover sequences. At step 1362, the PTRS bands may then be embedded, e.g., using DFT-s-OFDM, into a CP-OFDM transmission. Finally, at step 1364, the transmitter may transmit the embedded one or more PTRS signals on the physical shared channel allocation to one or more receiving units. Note that dashed lines around boxes in FIGS. 13A and 13B indicate optional steps that may be performed.

EXAMPLES

In the following sections, further exemplary embodiments are provided.

According to Example 1, a method for noise compensation in a wireless system is disclosed, comprising: obtaining a physical shared channel allocation, wherein the physical shared channel allocation comprises a number of physical resource blocks (PRBs) and one or more phase tracking reference signal (PTRS) frequency bands within the PRBs, wherein the one or more PTRS frequency bands comprise one or more PTRS signals; receiving a signal based on the physical shared channel allocation; filtering the received signal to extract the one or more PTRS frequency bands; processing the one or more PTRS frequency bands to obtain one or more time domain PTRS signals; estimating a phase noise for each PTRS frequency band of the one or more time domain PTRS signals; and applying the phase noise estimates to the received signal to create a noise-compensated signal.

Example 2 comprises the subject matter of Example 1, further comprising combining the phase noise estimates from two or more PTRS frequency bands to obtain the phase noise estimate of the PTRS frequency bands.

Example 3 comprises the subject matter of Example 1, further comprising applying a fast Fourier transform to the noise-compensated signal to generate a frequency domain processed received signal.

Example 4 comprises the subject matter of Example 1, wherein the PRBs form a number of contiguous PRBs within each PTRS frequency band.

Example 5 comprises the subject matter of Example 4, wherein guard tones are placed at edges of the contiguous PRBs.

Example 6 comprises the subject matter of Example 1, wherein the one or more PTRS frequency bands are evenly-distributed across the PRBs.

Example 7 comprises the subject matter of Example 1, wherein at least one of the one or more PTRS signals replaces a DMRS signal on one or more resource elements of the PRBs.

Example 8 comprises the subject matter of Example 1, further comprising interpolating phase noise estimates from two or more PTRS frequency bands to obtain a smoothed phase noise estimate for a PTRS frequency band.

Example 9 comprises the subject matter of Example 1, wherein two or more non-overlapping PTRS frequency bands are received on at least two PTRS ports.

Example 10 comprises the subject matter of Example 1, wherein the PTRS frequency bands are multiplexed using orthogonalized cover sequences.

Example 11 comprises a wireless device comprising: an antenna; a radio operably coupled to the antenna; and a processor operably coupled to the radio, wherein the wireless device is configured to compensate for noise in a wireless system by performing operations, comprising: obtaining a physical shared channel allocation, wherein the physical shared channel allocation comprises a number of physical resource blocks (PRBs) and one or more phase tracking reference signal (PTRS) frequency bands within the PRBs, wherein the one or more PTRS frequency bands comprise one or more PTRS signals; receiving a signal based on the physical shared channel allocation; filtering the received signal to extract the one or more PTRS frequency bands; processing the one or more PTRS frequency bands to obtain one or more time domain PTRS signals; estimating a phase noise for each PTRS frequency band of the one or more time domain PTRS signals; and applying the phase noise estimates to the received signal to create a noise-compensated signal.

Example 12 comprises the subject matter of Example 11, wherein the wireless device is further configured to combine the phase noise estimates from two or more PTRS frequency bands to obtain a final the phase noise estimate of the PTRS frequency bands.

Example 13 comprises the subject matter of Example 11, wherein the wireless device is further configured to apply a fast Fourier transform to the noise-compensated signal to generate a frequency domain processed received signal.

Example 14 comprises the subject matter of Example 11, wherein the PRBs form a number of contiguous PRBs within each PTRS frequency band.

Example 15 comprises the subject matter of Example 14, wherein guard tones are placed at edges of the contiguous PRBs.

Example 16 comprises the subject matter of Example 11, wherein the one or more PTRS frequency bands are evenly-distributed across the PRBs.

Example 17 comprises the subject matter of Example 11, wherein at least one of the one or more PTRS signals replaces a DMRS signal on one or more resource elements of the PRBs.

Example 18 comprises the subject matter of Example 11, wherein the wireless device is further configured to interpolate phase noise estimates from two or more PTRS frequency bands to obtain a smoothed phase noise estimate for a PTRS frequency band.

Example 19 comprises the subject matter of Example 11, wherein two or more non-overlapping PTRS frequency bands are received on at least two PTRS ports.

Example 20 comprises the subject matter of Example 11, wherein the PTRS frequency bands are multiplexed using orthogonalized cover sequences.

Example 21 comprises a non-volatile computer-readable medium that stores instructions that, when executed, cause one or more processors of a device to: obtain a physical shared channel allocation, wherein the physical shared channel allocation comprises a number of physical resource blocks (PRBs) and one or more phase tracking reference signal (PTRS) frequency bands within the PRBs, wherein the one or more PTRS frequency bands comprise one or more PTRS signals; receive a signal based on the physical shared channel allocation; filter the received signal to extract the one or more PTRS frequency bands; process the one or more PTRS frequency bands to obtain one or more time domain PTRS signals; estimate a phase noise for each PTRS frequency band of the one or more time domain PTRS signals; and apply the phase noise estimates to the received signal to create a noise-compensated signal.

Example 22 comprises the subject matter of Example 21, wherein the instructions further cause the one or more processors to combine the phase noise estimates from two or more PTRS frequency bands to obtain a final the phase noise estimate of the PTRS frequency bands.

Example 23 comprises the subject matter of Example 21, wherein the instructions further cause the one or more processors to apply a fast Fourier transform to the noise-compensated signal to generate a frequency domain processed received signal.

Example 24 comprises the subject matter of Example 21, wherein the PRBs form a number of contiguous PRBs within each PTRS frequency band.

Example 25 comprises the subject matter of Example 24, wherein guard tones are placed at edges of the contiguous PRBs.

Example 26 comprises the subject matter of Example 21, wherein the one or more PTRS frequency bands are evenly-distributed across the PRBs.

Example 27 comprises the subject matter of Example 21, wherein at least one of the one or more PTRS signals replaces a DMRS signal on one or more resource elements of the PRBs.

Example 28 comprises the subject matter of Example 21, wherein the instructions further cause the one or more processors to interpolate phase noise estimates from two or more PTRS frequency bands to obtain a smoothed phase noise estimate for a PTRS frequency band.

Example 29 comprises the subject matter of Example 21, wherein two or more non-overlapping PTRS frequency bands are received on at least two PTRS ports.

Example 30 comprises the subject matter of Example 21, wherein the PTRS frequency bands are multiplexed using orthogonalized cover sequences.

Example 31 comprises a method for noise compensation in a wireless system, comprising: obtaining a physical shared channel allocation, wherein the physical shared channel allocation comprises a number of physical resource blocks (PRBs) and one or more phase tracking reference signal (PTRS) frequency bands within the PRBs, wherein the one or more PTRS frequency bands comprise one or more PTRS signals; embedding the one or more PTRS frequency bands in a CP-OFDM based transmission; and transmitting the embedded one or more PTRS frequency bands in the CP-OFDM based transmission to one or more receiving units on the physical shared channel allocation.

Example 32 comprises the subject matter of Example 31, wherein the embedding of the one or more PTRS frequency bands comprises embedding using DFT-s-OFDM.

Example 33 comprises the subject matter of Example 31, wherein the PRBs form a number of contiguous PRBs within each PTRS frequency band.

Example 34 comprises the subject matter of Example 33, wherein guard tones are placed at edges of the contiguous PRBs.

Example 35 comprises the subject matter of Example 31, wherein the number of PTRS frequency bands are evenly-distributed across the PRBs.

Example 36 comprises the subject matter of Example 31, wherein at least one of the one or more PTRS signal replaces a DMRS signal on one or more resource elements of the PRBs.

Example 37 comprises the subject matter of Example 31, wherein two or more non-overlapping PTRS frequency bands are transmitted on at least two PTRS ports.

Example 38 comprises the subject matter of Example 31, wherein the PTRS frequency bands are multiplexed using orthogonalized cover sequences.

Example 39 comprises the subject matter of Example 37, wherein the PTRS frequency bands are multiplexed using orthogonalized cover sequences.

Example 40 comprises a method that includes any action or combination of actions as substantially described herein in the Detailed Description.

Example 41 comprises a method as substantially described herein with reference to each or any combination of the Figures included herein or with reference to each or any combination of paragraphs in the Detailed Description.

Example 42 comprises a wireless device configured to perform any action or combination of actions as substantially described herein in the Detailed Description as included in the wireless device.

Example 43 comprises a wireless station configured to perform any action or combination of actions as substantially described herein in the Detailed Description as included in the wireless station.

Example 44 comprises a non-volatile computer-readable medium that stores instructions that, when executed, cause the performance of any action or combination of actions as substantially described herein in the Detailed Description.

Example 45 comprises an integrated circuit configured to perform any action or combination of actions as substantially described herein in the Detailed Description.

Yet another exemplary embodiment may include a method, comprising, by a device, performing any or all parts of the preceding Examples.

A yet further exemplary embodiment may include a non-transitory computer-accessible memory medium comprising program instructions which, when executed at a device, cause the device to implement any or all parts of any of the preceding Examples.

A still further exemplary embodiment may include a computer program comprising instructions for performing any or all parts of any of the preceding Examples.

Yet another exemplary embodiment may include an apparatus comprising means for performing any or all of the elements of any of the preceding Examples.

Still another exemplary embodiment may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for noise compensation in a wireless system comprising:
   obtaining a physical shared channel allocation, wherein the physical shared channel allocation comprises a number of physical resource blocks (PRBs) and one or more phase tracking reference signal (PTRS) frequency bands within the PRBs, wherein the one or more PTRS frequency bands comprise one or more PTRS signals;
   receiving a signal based on the physical shared channel allocation;
   filtering the received signal to extract the one or more PTRS frequency bands;
   processing the one or more PTRS frequency bands to obtain one or more time domain PTRS signals;
   estimating a phase noise for each PTRS frequency band of the one or more time domain PTRS signals; and
   applying the phase noise estimates to the received signal to create a noise-compensated signal.

2. The method of claim 1, further comprising combining the phase noise estimates from two or more PTRS frequency bands to obtain the phase noise estimate of the PTRS frequency bands.

3. The method of claim 1, further comprising applying a fast Fourier transform to the noise-compensated signal to generate a frequency domain processed received signal.

4. The method of claim 1, wherein the PRBs form a number of contiguous PRBs within each PTRS frequency band.

5. The method of claim 1, wherein the one or more of PTRS frequency bands are evenly-distributed across the PRBs.

6. The method of claim 1, wherein at least one of the one or more PTRS signals replaces a DMRS signal on one or more resource elements of the PRBs.

7. The method of claim 1, further comprising interpolating phase noise estimates from two or more PTRS frequency bands to obtain a smoothed phase noise estimate for a PTRS frequency band.

8. The method of claim 1, wherein two or more non-overlapping PTRS frequency bands are received on at least two PTRS ports.

9. The method of claim 1, wherein the PTRS frequency bands are multiplexed using orthogonalized cover sequences.

10. A wireless device comprising:
    an antenna;
    a radio operably coupled to the antenna; and
    a processor operably coupled to the radio,
    wherein the wireless device is configured to compensate for noise in a wireless system by performing operations comprising:
      obtaining a physical shared channel allocation, wherein the physical shared channel allocation comprises a number of physical resource blocks (PRBs) and one or more phase tracking reference signal (PTRS) frequency bands within the PRBs, wherein the one or more PTRS frequency bands comprise one or more PTRS signals;
      receiving a signal based on the physical shared channel allocation;
      filtering the received signal to extract the one or more PTRS frequency bands;
      processing the one or more PTRS frequency bands to obtain one or more time domain PTRS signals;
      estimating a phase noise for each PTRS frequency band of the one or more time domain PTRS signals; and
      applying the phase noise estimates to the received signal to create a noise-compensated signal.

11. The wireless device of claim 10, wherein the wireless device is further configured to combine the phase noise estimates from two or more PTRS frequency bands to obtain a final the phase noise estimate of the PTRS frequency bands.

12. The wireless device of claim 10, wherein the wireless device is further configured to apply a fast Fourier transform to the noise-compensated signal to generate a frequency domain processed received signal.

13. The wireless device of claim 10, wherein the PRBs form a number of contiguous PRBs within each PTRS frequency band.

14. The wireless device of claim 10, wherein the one or more PTRS frequency bands are evenly-distributed across the PRBs.

15. The wireless device of claim 10, wherein at least one of the one or more PTRS signals replaces a DMRS signal on one or more resource elements of the PRBs.

16. The wireless device of claim 10, wherein the wireless device is further configured to interpolate phase noise estimates from two or more PTRS frequency bands to obtain a smoothed phase noise estimate for a PTRS frequency band.

17. The wireless device of claim 10, wherein two or more non-overlapping PTRS frequency bands are received on at least two PTRS ports.

18. The wireless device of claim 10, wherein the PTRS frequency bands are multiplexed using orthogonalized cover sequences.

19. A non-volatile computer-readable medium that stores instructions that, when executed, cause one or more processors of a device to:
 obtain a physical shared channel allocation, wherein the physical shared channel allocation comprises a number of physical resource blocks (PRBs) and one or more phase tracking reference signal (PTRS) frequency bands within the PRBs, wherein the one or more PTRS frequency bands comprise one or more PTRS signals;
 receive a signal based on the physical shared channel allocation;
 filter the received signal to extract the one or more PTRS frequency bands;
 process the one or more PTRS frequency bands to obtain one or more time domain PTRS signals;
 estimate a phase noise for each PTRS frequency band of the one or more time domain PTRS signals; and
 apply the phase noise estimates to the received signal to create a noise-compensated signal.

20. The non-volatile computer-readable medium of claim 19, wherein the instructions further cause the one or more processors to combine the phase noise estimates from two or more PTRS frequency bands to obtain a final the phase noise estimate of the PTRS frequency bands.

* * * * *